(12) United States Patent
Danner

(10) Patent No.: US 9,108,765 B1
(45) Date of Patent: Aug. 18, 2015

(54) FUEL AND OIL CARRIER APPARATUS

(71) Applicant: Dan G. Danner, Tulsa, OK (US)

(72) Inventor: Dan G. Danner, Tulsa, OK (US)

( * ) Notice: Subject to any disclaimer, the term of this patent is extended or adjusted under 35 U.S.C. 154(b) by 0 days.

(21) Appl. No.: 14/478,549

(22) Filed: Sep. 5, 2014

Related U.S. Application Data

(63) Continuation-in-part of application No. 14/474,629, filed on Sep. 2, 2014.

(60) Provisional application No. 61/995,700, filed on Apr. 18, 2014.

(51) Int. Cl.
*B65D 21/02* (2006.01)
*B67D 7/84* (2010.01)

(52) U.S. Cl.
CPC .............. *B65D 21/0202* (2013.01); *B67D 7/84* (2013.01)

(58) Field of Classification Search
CPC .... B65D 63/10; B65D 63/00; B65D 21/0204; B65D 21/0202; B65D 21/02; B65D 1/30; B65D 88/027; B65D 1/04; B67D 7/84
USPC ............ 220/23.4, 23.2, 23.83, 505, 507, 735, 220/23.86, 737, 740; 215/6; 206/428, 223, 206/216, 373, 372
See application file for complete search history.

(56) References Cited

U.S. PATENT DOCUMENTS

| | | | | |
|---|---|---|---|---|
| 2,994,426 | A * | 8/1961 | Biesecker et al. | 206/150 |
| 4,765,472 | A * | 8/1988 | Dent | 206/373 |
| 4,836,374 | A * | 6/1989 | Hutchins et al. | 206/373 |
| 5,147,079 | A * | 9/1992 | Heather | 224/148.6 |
| 6,325,251 | B1 * | 12/2001 | Santos | 222/192 |
| 7,341,377 | B1 * | 3/2008 | Baxter | 383/38 |
| 2004/0055679 | A1 * | 3/2004 | Gordon et al. | 150/112 |
| 2005/0029272 | A1 * | 2/2005 | Padilla | 220/735 |
| 2006/0196908 | A1 * | 9/2006 | DeAntoni | 224/904 |

* cited by examiner

*Primary Examiner* — Robert J Hicks
(74) *Attorney, Agent, or Firm* — Head, Johnson & Kachigian, P.C.

(57) ABSTRACT

A carrier for a standard fuel container and a standard oil container, where the carrier secures the oil container to the fuel container for easy transport. The carrier may further comprise a tool holder for securing a tool, such as a scrench, to the fuel container and oil container as well.

4 Claims, 5 Drawing Sheets

US 9,108,765 B1

FUEL AND OIL CARRIER APPARATUS

CROSS REFERENCE

This application is based on and claims priority to U.S. Provisional Patent Application No. 61/995,700 filed Apr. 18, 2014 and is a continuation in part of and claims priority to U.S. Utility patent application Ser. No. 14/474,629 filed Sep. 2, 2014.

BACKGROUND OF THE INVENTION

1. Field of the Invention

This invention relates generally to a holder for a fuel container, and more particularly, but not by way of limitation, to a strap that attaches storage receptacles for an oil can and one or more tools to a fuel container.

2. Description of the Related Art

Chainsaws in particular, and other fuel powered utility equipment in general, require both gasoline and oil or other lubricant for proper usage and maintenance. One or more tools are often also required. For example, maintenance of a chainsaw requires the use of both a screwdriver and a wrench, or the use of a combination tool such as a scrench.

The concept of containers having integral storage or having multiple uses is not new. Such concepts have been used throughout history. There have not, however, been fuel containers that offer storage capacity for an oil container that may be removed and replaced when depleted.

There likewise have not been fuel containers with secondary containers for carrying oil or lube and one or more tools for easy use and adaptability. In general, the prior art has not provided for fuel containers with smaller storage containers to be removed and adapted.

Based on the foregoing, it is desirable to provide a carrier for a fuel container and a receptacle for an oil or lube container.

It is further desirable to provide an additional receptacle for one or more tools.

It is further desirable to provide such a combination fuel/oil container holder with a receptacle particularly for a scrench.

It is further desirable for such a container to be used in conjunction with an existing fuel container.

SUMMARY OF THE INVENTION

In general, in a first aspect, the invention relates to a fuel and oil carrier comprising a first set of straps sized to fit around a fuel container and a second set of straps sized to fit around an oil container, where the second set of straps is attached to the first set of straps. The fuel and oil carrier may further comprise at least one tool holder attached to the first set of straps or to the second set of straps, where the tool holder may be sized to hold a combination screwdriver and wrench.

The first set of straps may comprise a horizontal strap capable of encircling the fuel container horizontally and a vertical strap capable of encircling the fuel container vertically. The vertical strap may be opened for insertion of the fuel container into the fuel and oil carrier into the fuel and oil carrier and then closed to secure the fuel container within the fuel and oil carrier. The vertical strap may be secured to the horizontal strap where the vertical strap and the horizontal strap intersect.

The second set of straps may comprise a horizontal strap capable of encircling the oil container horizontally, where the oil container has a front, a back, and a bottom and where the horizontal strap has a back portion adjacent the back of the oil container and a front portion adjacent the front of the oil container, and a vertical strap with a first end attached to the back portion of the horizontal strap and a second end attached to the front portion of the horizontal strap. The vertical strap may extend downward from the back portion of the horizontal strap, across the bottom of the oil container when the oil container is in place, and upward to the front portion of the horizontal strap, thus forming an open top receptacle for the oil container.

The fuel and oil carrier may be used in a method of transporting a fuel container and an oil container, the method comprising: opening the vertical strap of the fuel and oil carrier, inserting a fuel container with a handle into the first set of straps; closing the vertical strap to secure the fuel container within the fuel and oil carrier; inserting an oil container into the second set of straps; and carrying the fuel container and the oil container by the handle of the fuel container. If the fuel and oil carrier further comprises the tool holder, the method may further comprise inserting a tool into the tool holder.

Other advantages and features will be apparent from the following description and from the claims.

DETAILED DESCRIPTION OF THE INVENTION

The devices and methods discussed herein are merely illustrative of specific manners in which to make and use this invention and are not to be interpreted as limiting in scope.

While the devices and methods have been described with a certain degree of particularity, it is to be noted that many modifications may be made in the details of the construction and the arrangement of the devices and components without departing from the spirit and scope of this disclosure. It is understood that the devices and methods are not limited to the embodiments set forth herein for purposes of exemplification.

In general, in a first aspect, the invention relates to a fuel and oil carrier 1 for use with an existing fuel container 2 and an existing oil container 3. The fuel and oil carrier 1 may comprise a series of straps securing the oil container 3 to the fuel container 2. The fuel and oil carrier 1 may also secure a tool 4 to the fuel container 2 and/or oil container 3.

Figure 1:
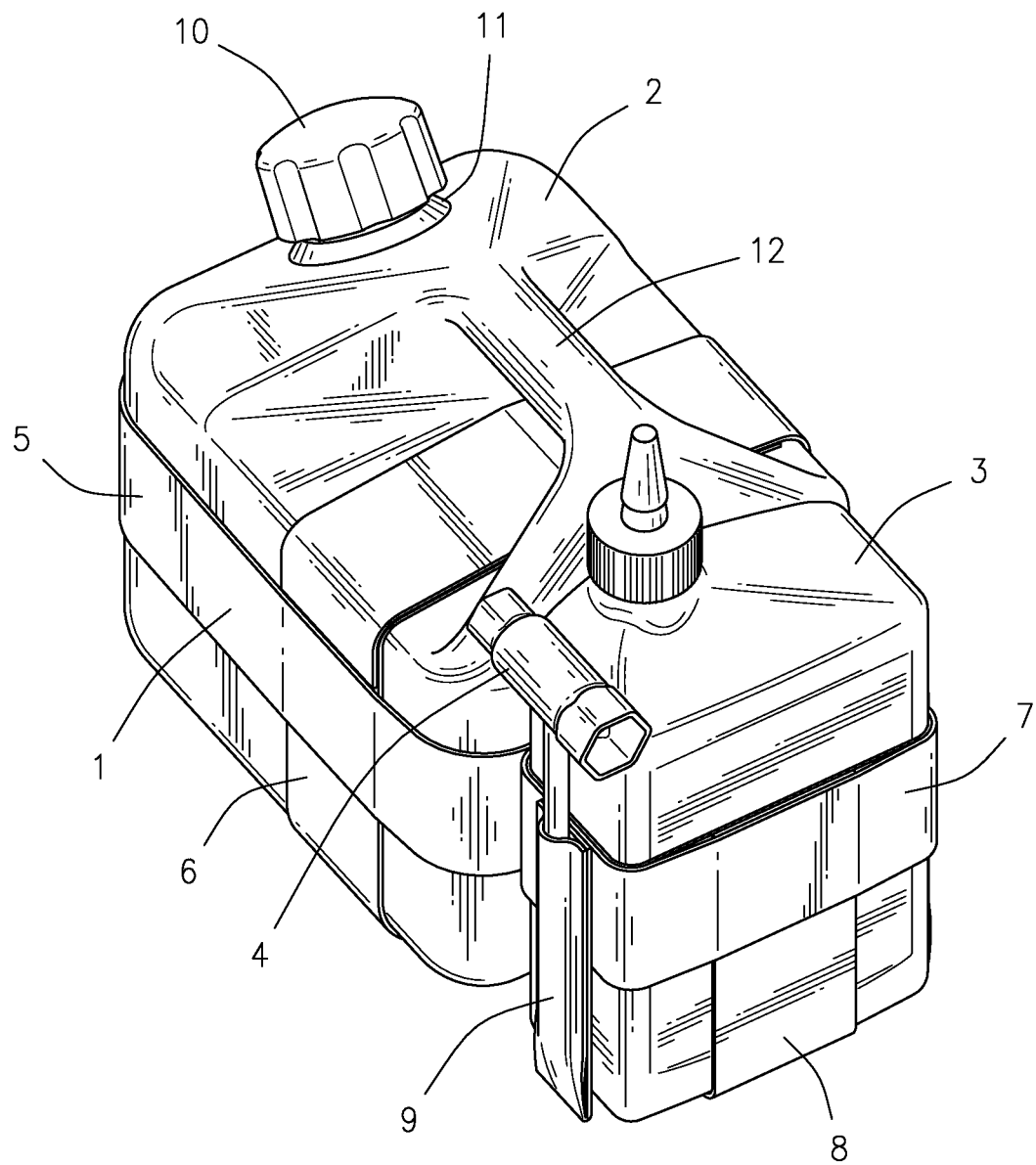
FIG. 1 is a perspective view of a fuel and oil carrier with a fuel container, an oil container, and a tool in place.
Figure 2:
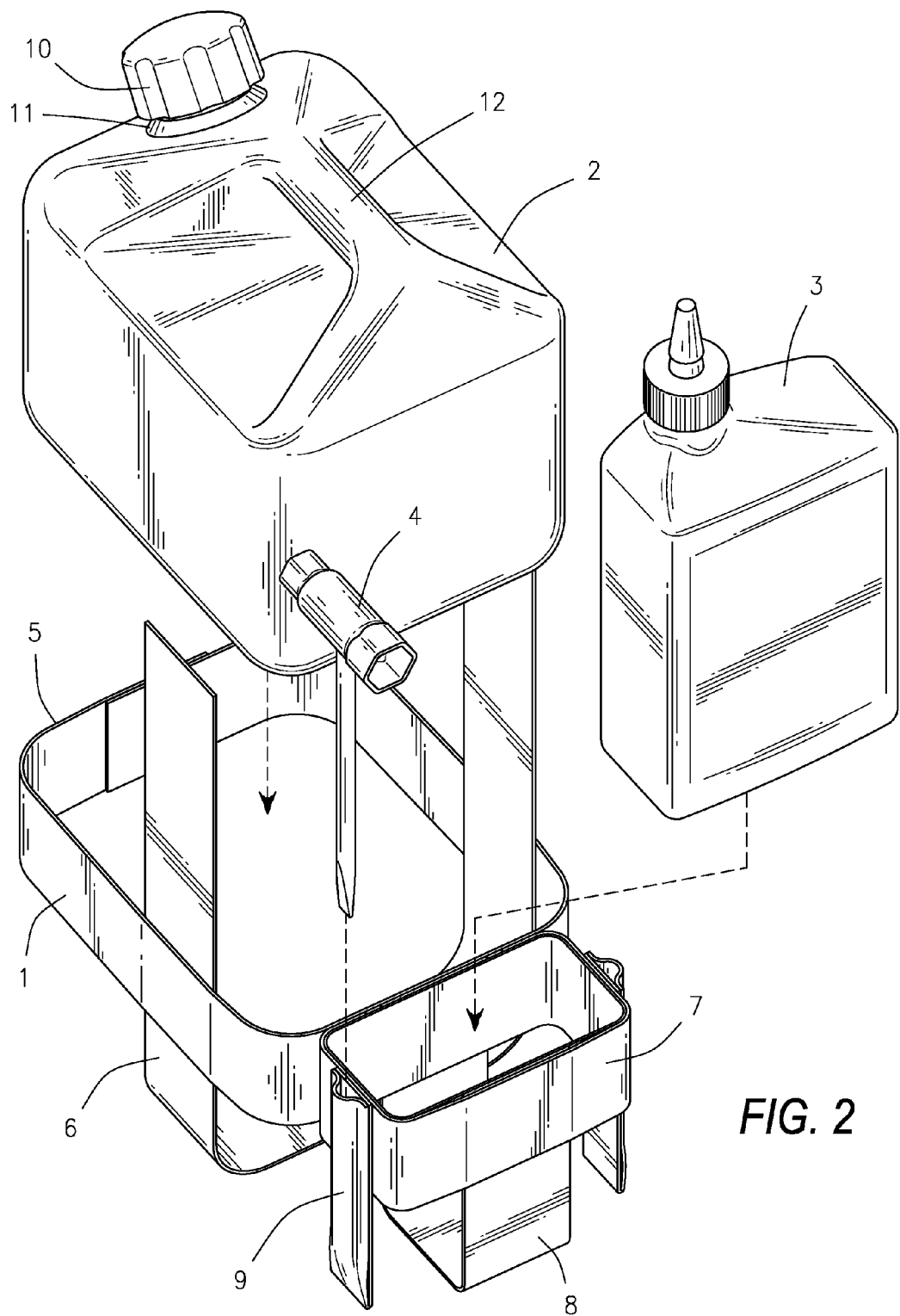
FIG. 2 is an exploded view of the fuel and oil carrier, fuel container, oil container, and tool.
Figure 3:
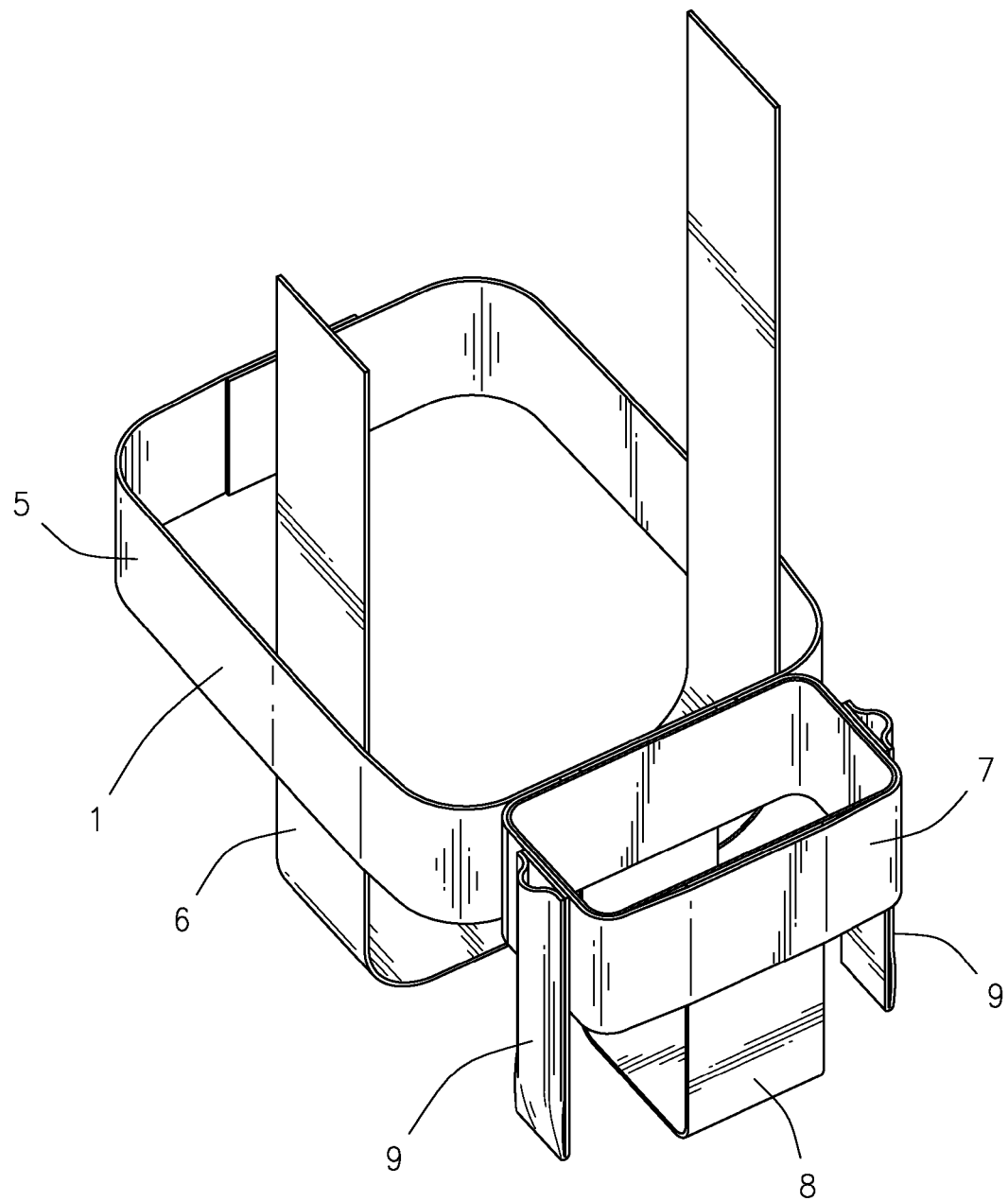
FIG. 3 is a perspective view of the fuel and oil carrier.
Figure 4:
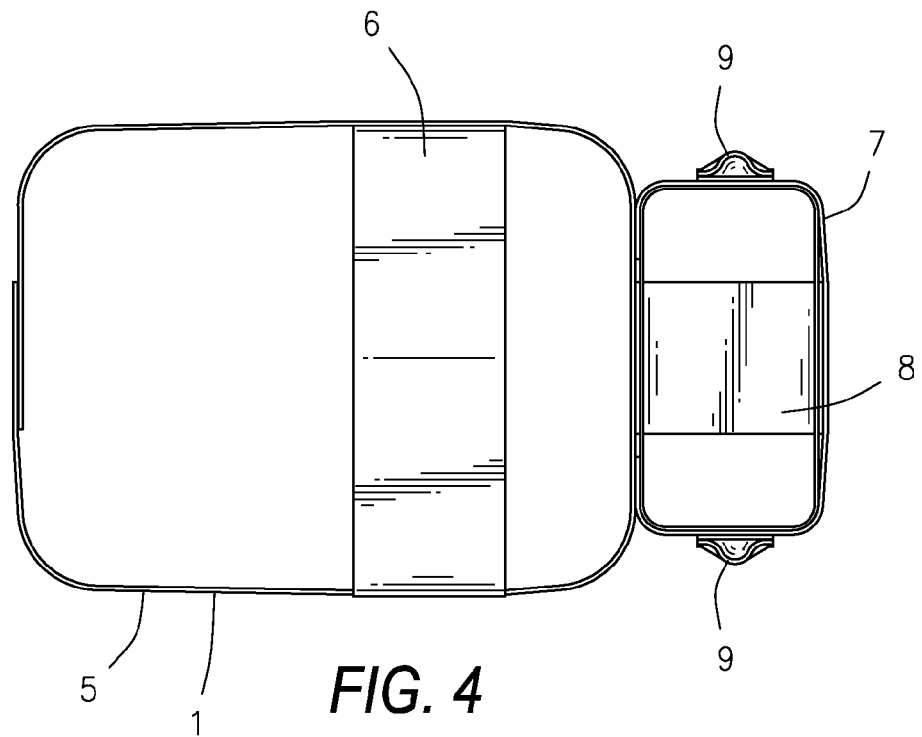
FIG. 4 is a top view of the fuel and oil carrier, where the bottom view is substantially identical.
Figure 5:
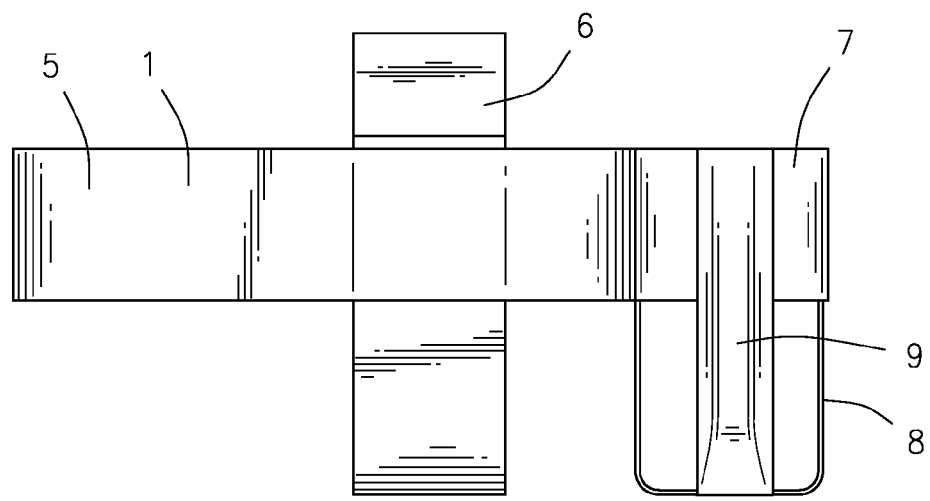
FIG. 5 is a side view of the fuel and oil carrier.
Figure 6:
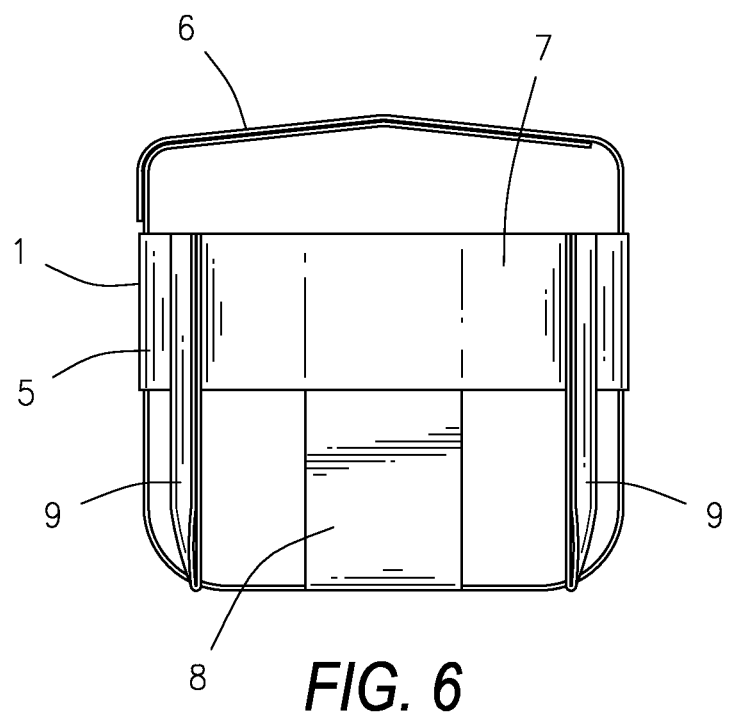
FIG. 6 is a front view of the fuel and oil carrier, where the back view is substantially identical.

The straps around the fuel container 2 may include a horizontal strap 5, which may wrap around the front, back, and both sides of the fuel container 1, and a vertical strap 6, which may wrap around the top, bottom, and both sides of the fuel container 1. The horizontal strap 5 may be secured to itself, as shown in FIGS. 1 through 6, such that it forms a loop and maintains its loop form throughout use. The vertical strap 6 may removably attach to itself such that it may form a loop when secured around the fuel container 2, as shown in FIGS. 1 and 4 through 6, or may be opened to a strap form, as shown in FIGS. 2 and 3, for insertion of the fuel container 2 into the fuel and oil container 1 or removal of the fuel container 2 therefrom. The horizontal strap 5 and the vertical strap 6 may be attached to each other where they intersect, namely on each side of the fuel container 2.

The straps around the oil container 3 may include a horizontal strap 7, which may wrap around the front, back, and both sides of the oil container 3, and a vertical strap 8, which may wrap around the bottom portion of the front, the bottom portion of the back, and the bottom of the oil container 3. The vertical strap 8 may extend from the portion of the horizontal strap 7 extending across the back of the oil container 3 to the portion of the horizontal strap 7 extending across the front of the oil container 3, but not above the horizontal strap 7 on either the front or the back. The vertical strap 8 may attach to the horizontal strap 7 on both ends, forming an open top receptacle for the oil container 3. The straps around the oil container 3 may be attached to the straps around the fuel container 2, thus securing the oil container 3 to the fuel container 2 during use. The straps may be either permanently attached or removably attached to allow straps sized to accommodate a different sized oil container 3 to be used, as desired. The straps may be attached such that the oil container 3 is located along the back wall of the fuel container 1, as shown. Specifically, horizontal strap 5 may attach to horizontal strap 7 at the back of both containers 1 and 2, as shown.

At least one tool holder 9 may be attached to the fuel and oil container 1. As shown in the Figures, one tool holder 9 may attach to each side of the horizontal strap 7 around the oil container 3. The one or more tool holders 9 may be permanently attached or removably attached to the horizontal strap 7. Each tool holder 9 may be an open top sleeve sized to receive a handled tool 4 such as a scrench as shown in FIGS. 1 and 2.

In use, a user may open the vertical strap 6, insert a fuel container 2 into the loop formed by the horizontal strap 5, and close the vertical strap 6, thus securing the fuel container 2 within the fuel and oil container 1. The user may then insert an oil container 3 into the open top receptacle formed by horizontal strap 7 and vertical strap 8 and a tool 4 into tool holder 9. This allows the user to carry the fuel container 2, the oil container 3, and the tool 4 by carrying the fuel container 2 by its handle 12. During use, the user may remove and replace both the oil container 3 and the tool 4 due to the open tops of their respective holders.

The fuel container 2 may be used to store and transport fuel, such as gasoline. The fuel container 2 may be any standard fuel container, and may have a threaded cap 10 on a correspondingly threaded neck 11 and a handle 12. The oil container 3 may likewise be any standard oil container 3, such as a bar lube, motor oil, or like lube or oil product typically contained in standardized containers. The oil may remain within the original existing oil container 3 throughout use, with no need to transfer it to a separate container.

Whereas, the devices and methods have been described in relation to the drawings and claims, it should be understood that other and further modifications, apart from those shown or suggested herein, may be made within the spirit and scope of this invention.

What is claimed is:

1. A fuel and oil carrier comprising:
   a first set of straps sized to fit around a fuel container, where the first set of straps comprises:
   a horizontal strap capable of encircling the fuel container horizontally, where the fuel container has a front, a back, a top, and a bottom and where the horizontal strap has a back portion adjacent the back of the fuel container and a front portion adjacent the front of the fuel container when the fuel container is in place; and
   a vertical strap capable of fully encircling the fuel container vertically, where the vertical straps extends downward from a first end to the back portion of the horizontal strap, downward from the back portion of the horizontal strap to the bottom of the fuel container when the fuel container is in place, across the bottom of the fuel container when the fuel container is in place, upward to the front portion of the horizontal strap, and upward from the front portion of the horizontal strap to a second end, where the first end is attached to the second end such that the vertical strap extends across the top of the fuel container when the fuel container is in place, and where the vertical strap may be opened for insertion of the fuel container into the fuel and oil carrier and then closed to secure the fuel container within the fuel and oil carrier;
   a second set of straps sized to fit around an oil container, where the second set of straps is attached to the first set of straps and where the second set of straps comprises:
   a horizontal strap capable of encircling the oil container horizontally, where the oil container has a front, a back, a top, and a bottom and where the horizontal strap has a back portion adjacent the back of the oil container and a front portion adjacent the front of the oil container when the oil container is in place; and
   a vertical strap with a first end attached to the back portion of the horizontal strap and a second end attached to the front portion of the horizontal strap, where the vertical strap extends downward from the back portion of the horizontal strap, across the bottom of the oil container when the oil container is in place, and upward to the front portion of the horizontal strap, without extending across the top of the oil container, thus forming an open top receptacle for the oil container; and
   a tool holder attached to the horizontal strap of the second set of straps, where the tool holder is a single sleeve extending downward from the horizontal strap with an open top and where the tool holder is sized to receive a combination screwdriver and wrench.

2. A method of transporting a fuel container and an oil container, the method comprising:
   opening a vertical strap of a fuel and oil carrier, where the fuel and oil carrier comprises:
   a first set of straps sized to fit around a fuel container, where the first set of straps comprises a horizontal strap capable of encircling the fuel container horizontally, where the fuel container has a front, a back, a top, and a bottom and where the horizontal strap has a back portion adjacent the front of the fuel container and a front portion adjacent the front of the fuel container when the fuel container is in place, and the vertical strap, where the vertical strap is capable of encircling the fuel container vertically, where the vertical strap extends downward from a first end to the back portion of the horizontal strap, downward from the back portion of the horizontal strap to the bottom of the fuel container when the fuel container is in place, across the bottom of the fuel container when the fuel container is in place, upward to the front portion of the horizontal strap, and upward from the front portion of the horizontal strap to a second end, where the first end is attached to the second end such that the vertical strap extends across the top of the fuel container when the fuel contain is in place, and where the vertical strap may be opened for insertion of the fuel container into the fuel and oil carrier and then closed to secure the fuel container within the fuel and oil carrier and where the vertical strap is secured to the horizontal strap where the vertical strap and the horizontal strap intersect; and a second set of straps sized to fit around an oil container, where the second set of straps is attached to the first set of straps and where the second set of straps comprises a horizontal strap capable of encircling the oil container horizontally, where the oil container has a front, a back, a top, and a bottom and where the horizontal strap has a back portion adjacent the back of the oil container and a front portion adjacent the front of the oil container when the oil container is in place, and a vertical strap with a first end attached to the back portion of the horizontal strap and a second end attached to the front portion of the horizontal strap, where the vertical strap extends downward from the back portion of the horizontal strap, across the bottom of the oil container when the oil container is in place, and upward to the front portion of the horizontal strap, without extending across the top of the oil container, thus forming an open top receptacle for the oil container;

inserting a fuel container with a handle into the first set of straps;

closing the vertical strap to secure the fuel container within the fuel and oil carrier;

inserting an oil container into the second set of straps; and carrying the fuel container and the oil container by the handle of the fuel container.

3. The method of claim 2, where the fuel and oil carrier further comprises at least one tool holder attached to the first set of straps or to the second set of straps, where the tool holder is a single sleeve extending downward from the horizontal strap with an open top and where the tool holder is sized to receive a combination screwdriver and wrench, and where the method further comprises inserting a tool into the tool holder.

4. A fuel and oil carrier comprising:

a fuel container;

a fuel container holder comprising a plurality of straps, where the straps comprise at least one horizontal strap fully encircling the fuel container and at least one vertical strap fully encircling the fuel container;

an oil container with a top and a bottom;

an open top oil container holder comprising a plurality of straps, where the straps comprise at least one horizontal strap fully encircling the fuel container and at least one vertical strap, where the vertical strap extends around the bottom of the oil container but does not extend around the top of the oil container, where the open top oil container holder is attached to the fuel container holder;

a combination screwdriver and wrench; and a holder for the combination screwdriver and wrench comprising an open top sleeve attached to the open top oil container holder or the fuel container holder.

* * * * *